(12) United States Patent
Hsu et al.

(10) Patent No.: US 7,085,953 B1
(45) Date of Patent: Aug. 1, 2006

(54) METHOD AND MEANS FOR TOLERATING MULTIPLE DEPENDENT OR ARBITRARY DOUBLE DISK FAILURES IN A DISK ARRAY

(75) Inventors: Windsor Wee Sun Hsu, Sunnyvale, CA (US); Jaishankar Moothedath Menon, San Jose, CA (US); Honesty Cheng Young, Saratoga, CA (US); Spencer W. Ng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 10/286,197

(22) Filed: Nov. 1, 2002

(51) Int. Cl.
*G06F 11/00* (2006.01)
(52) U.S. Cl. ........................................................ 714/5
(58) Field of Classification Search ............... 714/7, 714/6
See application file for complete search history.

(56) References Cited

U.S. PATENT DOCUMENTS

| | | | |
|---|---|---|---|
| 4,761,785 A | 8/1988 | Clark et al. | |
| 5,258,984 A | 11/1993 | Menon et al. | |
| 5,333,305 A | 7/1994 | Neufeld | |
| 5,392,244 A * | 2/1995 | Jacobson et al. | 711/114 |
| 5,572,660 A | 11/1996 | Jones | |
| 5,579,474 A | 11/1996 | Kakuta et al. | |
| 5,708,771 A | 1/1998 | Brant et al. | |
| 5,742,792 A * | 4/1998 | Yanai et al. | 711/162 |
| 5,805,788 A | 9/1998 | Johnson | |
| 5,862,312 A | 1/1999 | Mann et al. | |
| 5,996,089 A | 11/1999 | Mann et al. | |
| 6,049,890 A | 4/2000 | Kakuta et al. | |
| 6,076,142 A * | 6/2000 | Corrington et al. | 711/114 |
| 6,256,749 B1 | 7/2001 | Kakuta et al. | |

(Continued)

FOREIGN PATENT DOCUMENTS

EP 0 785 512 A2 7/1997

(Continued)

OTHER PUBLICATIONS

Chung-Sheng Li, Ming-Syan Chen, Philip S. Yu, and Hui-I Hsiao. "Combining Replication And Parity Approaches For Fault-Tolerant Disk Arrays", Proceedings of the 1994 IEEE Symposium on Parallel and Distributed Processing, IBM Thomas J. Watson Research Center, p. 360-367.*

(Continued)

*Primary Examiner*—Robert Beausoliel
*Assistant Examiner*—Elmira Mehrmanesh
(74) *Attorney, Agent, or Firm*—Banner & Witcoff, LTD; Joseph P. Curtin

(57) ABSTRACT

Stored data can be recovered from a disk array having at least 2n+1 physical disks that are capable of storing n physical disks worth of data when any two disks fail, or when more than two dependent disks fail. Data is stored in data stripes that are divided into n substantially equal-sized strips and are distributed across the n disks. Each data stripe has a corresponding parity strip that is generated by including the data strips in the data stripe only once when the parity strip is generated. The data strips of each data stripe, the copy of each such data strip and the corresponding parity strip are distributed across the disks in such a manner that the data strips of each data stripe, the copy of each such data strip and the corresponding parity strip are each on a respectively different disk of the disk array.

22 Claims, 6 Drawing Sheets

100

101

| DISK 0 | DISK 1 | DISK 2 | DISK 3 |
|---|---|---|---|
| D0 | D1 | D2 | P0 |
| D3 | D4 | P1 | D5 |
| D6 | P2 | D7 | D8 |
| P3 | D9 | D10 | D11 |

102

| DISK 4 | DISK 5 | DISK 6 |
|---|---|---|
| D0 | D1 | D2 |
| D3 | D4 | D5 |
| D6 | D7 | D8 |
| D9 | D10 | D11 |

U.S. PATENT DOCUMENTS

| | | | |
|---|---|---|---|
| 6,279,138 B1 * | 8/2001 | Jadav et al. | 714/800 |
| 6,327,672 B1 | 12/2001 | Wilner | |
| 6,334,168 B1 | 12/2001 | Islam et al. | |
| 6,353,895 B1 | 3/2002 | Stephenson | |
| 6,449,730 B1 | 9/2002 | Mann et al. | |
| 6,845,472 B1 * | 1/2005 | Walker et al. | 714/42 |

FOREIGN PATENT DOCUMENTS

| | | |
|---|---|---|
| JP | 2001043031 | 2/2001 |

OTHER PUBLICATIONS

A. Merchant et al., "Dual Stripping for Replicated Data Disk Array," Research Disclosure, No. 345, Kenneth Mason Publication Ltd, England, Jan. 10, 1993.

R. Mattson et al., "Automatic Reconfiguration of Disk Arrays," Research Disclosure, No. 343, Kenneth Mason Publications Ltd., England, Nov. 1992.

* cited by examiner

| DISK 0 | DISK 1 | DISK 2 | DISK 3 |
|--------|--------|--------|--------|
| D0 | D1 | D2 | P0 |
| D3 | D4 | P1 | D5 |
| D6 | P2 | D7 | D8 |
| P3 | D9 | D10 | D11 |

101

| DISK 4 | DISK 5 | DISK 6 |
|--------|--------|--------|
| D0 | D1 | D2 |
| D3 | D4 | D5 |
| D6 | D7 | D8 |
| D9 | D10 | D11 |

| DISK 0 | DISK 1 | DISK 2 | DISK 3 |
|--------|--------|--------|--------|
| D0 | D1 | D2 | P0 |
| D3 | D4 | P1 | D5 |
| D6 | P2 | D7 | D8 |
| P3 | D9 | D10 | D11 |
| D12 | D13 | D14 | P4 |
| D15 | D16 | P5 | D17 |
| D18 | P6 | D19 | D20 |
| P7 | D21 | D22 | D23 |

202

| DISK 4 | DISK 5 | DISK 6 | DISK 7 |
|--------|--------|--------|--------|
| D0 | D1 | D2 | S0 |
| D3 | D4 | S1 | D5 |
| D6 | S2 | D7 | D8 |
| S3 | D9 | D10 | D11 |
| D12 | D13 | D14 | S4 |
| D15 | D16 | S5 | D17 |
| D18 | S6 | D19 | D20 |
| S7 | D21 | D22 | D23 |

| DISK 0 | DISK 1 | DISK 2 | DISK 3 |
|--------|--------|--------|--------|
| D0 | ~~D1~~ | D2 | P0 |
| D3 | ~~D4~~ | P1 | D5 |
| D6 | ~~P2~~ | D7 | D8 |
| P3 | ~~D9~~ | D10 | D11 |
| D12 | ~~D13~~ | D14 | P4 |
| D15 | ~~D16~~ | P5 | D17 |
| D18 | ~~P6~~ | D19 | D20 |
| P7 | ~~D21~~ | D22 | D23 |

301

| DISK 4 | DISK 5 | DISK 6 | DISK 7 |
|--------|--------|--------|--------|
| D0 | D1 | D2 | D1 |
| D3 | D4 | D4 | D5 |
| D6 | P2 | D7 | D8 |
| D9 | D9 | D10 | D11 |
| D12 | D13 | D14 | D13 |
| D15 | D16 | D16 | D17 |
| D18 | P6 | D19 | D20 |
| D21 | D21 | D22 | D23 |

| DISK 0 | DISK 1 | DISK 2 | DISK 3 | DISK 4 | DISK 5 | DISK 6 |
|--------|--------|--------|--------|--------|--------|--------|
| D0 | D1 | D2 | D0 | D1 | D2 | P0 |
| D3 | D4 | D5 | D3 | D4 | P1 | D5 |
| D6 | D7 | D8 | D6 | P2 | D7 | D8 |
| D9 | D10 | D11 | P3 | D9 | D10 | D11 |
| D12 | D13 | P4 | D14 | D12 | D13 | D14 |
| D15 | P5 | D16 | D17 | D15 | D16 | D17 |
| P6 | D18 | D19 | D20 | D18 | D19 | D20 |

| DISK 0 | DISK 1 | DISK 2 | DISK 3 | DISK 4 | DISK 5 | DISK 6 | DISK 7 |
|---|---|---|---|---|---|---|---|
| D0 | D1 | D2 | D0 | D1 | D2 | P0 | S0 |
| D3 | D4 | D5 | D3 | D4 | P1 | S1 | D5 |
| D6 | D7 | D8 | D6 | P2 | S2 | D7 | D8 |
| D9 | D10 | D11 | P3 | S3 | D9 | D10 | D11 |
| D12 | D13 | P4 | S4 | D14 | D12 | D13 | D14 |
| D15 | P5 | S5 | D16 | D17 | D15 | D16 | D17 |
| P6 | S6 | D18 | D19 | D20 | D18 | D19 | D20 |
| S7 | D21 | D22 | D23 | D21 | D22 | D23 | P7 |

| DISK 0 | DISK 1 | DISK 2 | DISK 3 | DISK 4 | DISK 5 | DISK 6 | DISK 7 |
|--------|--------|--------|--------|--------|--------|--------|--------|
| D0 | D1 | D2 | P0 | D0 | D1 | D2 | S0 |
| D3 | D4 | P1 | D5 | D3 | D4 | S1 | D5 |
| D6 | P2 | D7 | D8 | D6 | S2 | D7 | D8 |
| P3 | D9 | D10 | D11 | S3 | D9 | D10 | D11 |
| D12 | D13 | D14 | S4 | D12 | D13 | D14 | P4 |
| D15 | D16 | S5 | D17 | D15 | D16 | P5 | D17 |
| D18 | S6 | D19 | D20 | D18 | P6 | D19 | D20 |
| S7 | D21 | D22 | D23 | P7 | D21 | D22 | D23 |

METHOD AND MEANS FOR TOLERATING MULTIPLE DEPENDENT OR ARBITRARY DOUBLE DISK FAILURES IN A DISK ARRAY

BACKGROUND OF THE INVENTION

1. Field of the Invention

The present invention relates to the field of mass storage devices. More particularly, the present invention relates to disk arrays that can tolerate multiple dependent disk failures or arbitrary double disk failures without losing any stored data.

2. Description of the Related Art

Disks are often organized into arrays for performance and manageability purposes. To prevent a failure of any disk within an array from causing data to be lost, the data is stored in a redundant fashion across the disks of an array so that a subset of the disks is sufficient for deriving all of the data that has been stored in the array. To date, most systems are designed to tolerate a single disk failure. The rationale for designing for a single disk failure is that disk failures should be relatively rare so that when a disk fails, there is enough time to recover from the failure before another failure occurs.

Field data suggests, however, that disks failures may be dependent. That is, a second disk failure within a storage system or a disk array is more likely to occur soon after the first failure. Such dependency could result simply from the fact that the disks within an array tend to come from the same batch of disks, are subjected to the same physical and electrical conditions, handle the same workload and commands from the same controller, etc. Additionally, the act of a disk failing within an array could trigger changes in the system that stress the remaining disks. Even the act of replacing the failed disk could increase the chances of something else going wrong in the array. For instance, the wrong disk could be replaced.

There are several trends in the industry that make single-failure fault-tolerance less and less sufficient. Firstly, more and more disks are being grouped into an array. Accordingly, the chances of having multiple failures within an array are increasing. Secondly, disk capacity is increasing faster than increases in data rate. Consequently, the time to rebuild a disk is generally increasing, thereby lengthening the window during which the array could be vulnerable to a subsequent disk failure. Thirdly, disk vendors are continuing to aggressively increase a real density. Historically, this has caused a reduction in disk reliability can be expected to continue in the future. Fourthly, the cost associated with a multiple-disk failure is increasing. Techniques like virtualization, which can spread a host Logical Unit Number (LUN) across many disk arrays, increase the adverse impact of a multiple disk failure because many more host LUNs could be impacted.

Conventional techniques for recovering from multiple disk failures in a disk array can be broadly classified into double-parity, double mirroring and RAID 51-type schemes. Double-parity type schemes extend RAID 5-type schemes (which use single parity) to use double parity. One disadvantage of a double-parity-type scheme is an inflexibility in the number of disks that are supported, such as a prime number of disks. See, for example, L. Xu et al., "X-Code: MDS array codes with optimal encoding," IEEE Transactions on Information Theory, 45, 1, pp. 272–276, 1999. Another disadvantage of double-parity-type schemes is that a highly complex update procedure may be required in which each update of a block may require several other blocks to be updated. See, for example, M. Blaum et al., "The EVENODD code and its generalization: An efficient scheme for tolerating multiple disk failures in RAID architectures," High Performance Mass Storage and Parallel I/O: Technologies and Applications (H. Jin et al. eds.), Ch. 14, pp. 187–208, New York, N.Y.: IEEE Computer Society Press and Wiley, 2001. Yet another disadvantage of double-parity-type schemes is that parity encoding and decoding complexity may be high. See, for example, P. M. Chen et al., "RAID: High-performance, reliable secondary storage," ACM Computing Surveys, 26, 2, pp. 145–185, June 1994. Each write request incurs at least three disk read operations and three disk write operations. Double-parity-type schemes can tolerate at most two disk failures.

In a double-mirroring-type scheme, data is mirrored twice so that there are three copies of the data. Each write request incurs three disk write operations to update each copy. Double-mirror schemes use three times the storage of an unprotected array.

A RAID 51-type scheme protects data against a single disk failure and mirrors the RAID 5 array to protect up to three arbitrary disk failures. On a write request, two disk read operations and four disk write operations are incurred.

U.S. Pat. No. 5,258,984 to Menon et al, entitled "Method and means for distributed sparing in DASD Arrays," discloses the even distribution of spare space among all the disks in a disk array for improved performance.

What is needed is an efficient technique for storing data on an array of disks such that the data is still available even when any two disks of the array fail, or when a failure occurs of more than two dependent disks.

BRIEF SUMMARY OF THE INVENTION

The present invention provides an efficient technique for storing data on an array of disks such that the data is still available when any two disks of the array fail, or when a failure occurs of more than two dependent disks.

The advantages of the present invention are provided by a disk array comprising at least 2n+1 physical disks that are capable of storing n physical disks worth of data. Data is stored on the physical disks in at least one data stripe. Each data stripe is divided into n substantially equal-sized groups called strips. Each data stripe has a corresponding parity strip that is generated by including each of the data strips only once when the parity strip is generated. The data strips in each data stripe, a copy of each such data strip and the corresponding parity strip for each data stripe are distributed across the 2n+1 physical disks of the disk array. The distribution is performed in such a manner that each data strip of the data stripe, the copy of each such data strip and the corresponding parity strip for each data stripe are each on a respectively different disk of the disk array. When the disk array includes at least one spare physical disk, the data strips for each data stripe, the copy of each such data strip and the corresponding parity strip for each data stripe are distributed across the 2n+1 physical disks and each spare disk of the disk array. The distribution is such that the data strips for each data stripe, the copy of each such data strip and the corresponding parity strip for each data stripe are each on a respectively different disk of the disk array.

Another embodiment of the present invention provides a disk array system having a plurality of disks in which at least one disk is visible to a host data processing system. The disk array system is responsive to a host data write request from the host data processing system by performing only two read operations of the plurality of disks and only three write operations to the plurality of disks. According to the invention, the disk array system is capable of recovering all stored data when a failure occurs of any two disks of the plurality of disks. A first alternative embodiment provides that the plurality of disks store data, a full copy of the data, and parity data computed over at least one subset of the data. A second alternative embodiment provides that the parity data is distributed substantially evenly among the plurality of disks in the array as a RAID 5 system configuration. Yet a third alternative embodiment provides that at least one disk of the plurality of disks is a spare disk, and that the spare space provided by each spare disk is distributed substantially evenly among the plurality of disks.

Still a fourth alternative embodiment provides that the plurality of disks is partitioned into two sub-arrays with a controller controlling each respective sub-array. Accordingly, the two sub-arrays can be co-located or located remotely from each other. One sub-array is preferably arranged as a RAID 5 system configuration, while the other sub-array is arranged as a RAID 0 system configuration. The sub-array arranged as a RAID 0 system configuration stores mirrored data of data stored on the sub-array arranged as the RAID 5 system configuration, but stores no parity data of the data stored on the sub-array arranged as the RAID 5 system configuration. Requests received from the host data processing system are selectively directed to either of the two sub-arrays for substantially balancing a workload of each disk of the two sub-arrays.

Another alternative embodiment provides that the plurality of disks is partitioned into two sub-arrays and that at least one disk of the plurality of disks is a spare disk. Spare space provided by each spare disk is distributed substantially evenly among the sub-arrays and among the plurality of disks. RAID 5 system parity stored by the disk array system is distributed substantially evenly among the sub-arrays and among the plurality of disks. One sub-array stores mirrored data of data stored on the other sub-array.

Another embodiment of the present invention provides a method for storing data in a disk array having at least 2n+1 physical disks that are capable of storing n physical disks worth of data. Data is stored on the physical disks in at least one data stripe, such that each data stripe is divided into n substantially equal-sized groups called strips. A parity strip is generated for each respective data stripe, such that each data strip of a data stripe is included in the corresponding generated parity strip only once. The data strips in each data stripe, a copy of each such data strip and the corresponding parity strip for each data stripe are then distributed across the 2n+1 physical disks of the disk array. The distribution is such that the data strips in each data stripe, the copy of each such data strip and the corresponding parity strip for each data stripe are each on a respectively different disk of the disk array.

BRIEF DESCRIPTION OF THE DRAWINGS

The present invention is illustrated by way of example and not by limitation in the accompanying figures in which like reference numerals indicate similar elements and in which:

FIG. 1 depicts an exemplary system utilizing a parity-protected mirrored-array technique according to the present invention;

FIG. 2 depicts an exemplary system utilizing a parity-protected mirrored-array technique and distributed sparing according to the present invention;

FIG. 3 depicts an exemplary recovery when there is a failure of a disk 1 in a sub-array of the exemplary system shown in FIG. 2;

FIG. 4 depicts an exemplary system utilizing a parity-protected mirror-array technique according to the present invention with parity distributed across all of the disks of the system;

FIG. 5 depicts an exemplary system utilizing a parity-protected mirrored-array technique according to the present invention with parity and sparing distributed across all of the disks of the system; and FIG. 6 depicts another exemplary system utilizing a parity-protected mirrored-array technique of the present invention having symmetry and parity and sparing distributed across all of the disks of the system.

DETAILED DESCRIPTION OF THE INVENTION

The present invention provides a technique for storing data on an array of disks such that the data is still available when any two disks of the array fail, or when a failure occurs of more than two dependent disks. Additionally, the present invention provides a disk array having storage capacity equivalent to any number of disks, uses only XOR operations, and is optimal in the number of disk writes that are needed for tolerating a failure of any two disks.

A disk array that can tolerate a failure of any two disks must store at least three independent copies of the data. In that regard, the present invention maintains the original copy of the data, an additional full copy and a derived copy made up of parity data computed across subsets of the data. The amount of storage required by the present invention is just over twice that of a non-protected disk array.

FIG. 1 depicts an exemplary system 100 utilizing a parity-protected mirrored-array technique according to the present invention. System 100 includes a total of seven Disks 0–6 having a total capacity equivalent to 3 disks. Disks 0–6 are organized into a first sub-array 101 and a second sub-array 102. Sub-array 101 includes a group of four disks, i.e., Disks 0–3. Sub-array 102 includes a group of three disks, i.e., Disks 4–6. In FIGS. 1–6, D, refers to data unit (or strip) i, and $P_j$ refers to the parity for row or stripe j. Mirroring the data on the three disks of sub-array 102 and adding a disk to provide space for parity in sub-array 101 protects the data. Sub-array 101 is organized as a RAID 5 array system, while sub-array 102 is organized as a RAID 0 array system.

During a host read operation, the data can be read from either sub-array 101 or sub-array 102. During a host write operation, both copies of the data and the corresponding parity in the first array must be updated. The write operation in sub-array 101 proceeds as a RAID 5 system update, meaning that for small writes, the old value of the data and the corresponding old parity must be read, the new parity computed, and the new data and new parity written, thereby requiring two disk read operations and two disk write operations. The write in the second array proceeds as a RAID 0 system update, meaning that the data is simply written. Thus, for a host write operation, a total of two disk read operations and three disk write operations are required. Incurring three disk write operations is optimal because at least three copies of the data are needed for tolerating any two-disk failures. The host write operation can be flagged as complete when one or both of the sub-arrays have been updated. In contrast to a RAID 51 scheme, the present invention requires one less write operation for every host write request, in addition to requiring one less disk.

During a host write operation, sub-array 101 must service the read operation of the old parity, and the write operations of the new parity and the new data. To balance the load across the two arrays, the old data can be read from sub-array 102. Thus, sub-array 101 handles three I/Os per host write operation and sub-array 102 handles two I/Os per host write operation. To further balance the load, more host read operations can be serviced with sub-array 102. For instance, suppose r is the fraction of read operations in the workload. Let f be the fraction of read operations that should be serviced by sub-array 101.

For each incoming I/O request:

the average number of disk read operations incurred in sub-array 101=rf;

the average number of disk write operations incurred in sub-array 101=3(1−r);

the average number of disk read operations incurred in sub-array 102=r(1−f); and the average number of disk write operations incurred in sub-array 102=2(1−r).

To balance the load:

$$rf+3(1-r)=r(1-f)+2(1-r).$$

Thus, $$f = 1 - \frac{1}{2r}.$$

In other words, the fraction of read operations that should be directed to sub-array 101 is $$1 - \frac{1}{2r}.$$

The load across sub-arrays 101 and 102 can be balanced in a similar manner, taking into account the fact that sub-array 102 has one fewer disk than sub-array 101.

System 100 is able to tolerate up to one disk failure in sub-array 101 together with an arbitrary number of disk failures in sub-array 102, or an arbitrary number of disk failures in sub-array 101 provided that no disk failures occur in sub-array 102. In other words, system 100 offers data loss protection from the failure of any two disks, or the failure of multiple disks within the same sub-array. Thus, data protection provided by the present invention addresses what is experienced in practice in that failure rates of disks in a storage system tend to show some correlation and failure rates within an array tend to also be correlated.

When one or more disks fail, data is recovered using a combination of RAID 1 and RAID 5 system rebuild. Because a RAID 1 rebuild is more efficient, a RAID 1 system rebuild is utilized on as much as possible. For example, when one or more disks in sub-array 101 fail, the data blocks are first recovered from sub-array 102 and then the lost parity is regenerated. When any number of disks in sub-array 102 fails, the data on the bad disks is recovered by simply copying the data from sub-array 101. When a disk within sub-array 101 and some disks within sub-array 102 fail, the recovery process starts by rebuilding sub-array 101. When the data is on an operational drive in sub-array 102, the data is copied from sub-array 102 and then the lost parity is regenerated. Otherwise, the data is recovered using a RAID 5 system rebuild. Once sub-array 101 has been rebuilt, sub-array 102 is repaired by simply copying the data from sub-array 101.

To further reduce the probability of data loss, another disk can be added to sub-array 102 to provide spare space ready to be used for rebuilding system 100 when a failure is detected, and thereby minimizing the window of time during which system 100 would be in a degraded mode. Distributed sparing can be used with exemplary system 100 by adding another disk to sub-array 102 and logically spreading the available spare space across all the disks in sub-array 102.

FIG. 2 depicts an exemplary system 200 utilizing a parity-protected mirrored-array technique and distributed sparing according to the present invention. System 200 includes a total of eight disks, Disks 0–7, which are organized into a first sub-array 201 and a second sub-array 202. Sub-array 201 includes a group of four disks, i.e., Disks 0–3. Sub-array 202 includes a group of four disks, i.e., Disks 4–7. The blocks are arranged in an exemplary manner, as shown in FIG. 2, in which the $S_k$'s represent the spare space for stripe k. When there is a disk failure in either sub-array 201 or 202, the recovered blocks are moved into the spare locations that are distributed across sub-array 202.

FIG. 3 depicts an exemplary recovery when there is a failure of Disk 1 in a sub-array 301 (corresponding to sub-array 201 of system 200 shown in FIG. 2). For instance, when there is a failure of Disk 1 in sub-array 301 (as shown by the blocks of Disk 1 being crossed out), the failed blocks are recovered and stored in sub-array 302, as shown in FIG. 3.

With the addition of a distributed spare disk to sub-array 202, sub-arrays 201 and 202 become symmetrical, with the exception that parity is not written to sub-array 202. Such symmetry simplifies the system and offers practical advantages in packaging. Additionally, failure boundaries in the two sub-arrays are aligned. Thus, any disk failure in either sub-array 201 or 202 will impact the data that is stored on only one disk in the other sub-array. Moreover, in addition to the failure scenarios described above, such a system is able to tolerate the failure of arbitrary disks in both sub-arrays as long as their mirrored counterparts in the other sub-array remain operational. For example, the array can tolerate the failure of disk 0 and disk 3 in sub-array 201 together with the failure of disk 5 and disk 6 in sub-array 202.

It should be apparent that the present invention is applicable to a disk array in which two disk arrays (and/or sub-arrays) are physically in different storage systems. Accordingly, the present invention is applicable to systems in which the sub-arrays are geographically separated, as might be the case in which one first sub-array is located at a local site and another sub-array is located at a remote disaster recovery site, and the two arrays are connected by long-haul networks. Moreover, the disks in the two sub-arrays can be of different types and capacities, and while advantageous, it is not necessary for the two sub-arrays to have the same number of disks.

Although the present invention has been described in terms of physical disks as the storage devices of two sub-arrays, the techniques of the present invention are applicable to other forms of mass storage, such as optical storage and MEMS (MicroElectroMechanical Systems)-based storage.

The embodiments of the systems utilizing a parity-protected mirrored-array technique of the present invention thus far described are based on using existing RAID 5 and RAID 0 array systems. If the flexibility is available for designing a system utilizing a parity-protected mirror-array technique according to the present invention at the outset, it is advantageous to distribute parity across all of the disks for a better load balance and, consequently, better performance. FIG. 4 depicts an exemplary system 400 utilizing a parity-protected mirrored-array technique according to the present invention with parity distributed across all of the disks of the system. System 400 includes a total of seven disks. Parity is distributed across all of the seven disks.

FIG. 5 depicts an exemplary system 500 utilizing a parity-protected mirrored-array technique according to the present invention with parity and sparing distributed across all of the disks of the system. System 500 includes a total of eight disks.

With the principle of aligned failure boundaries in mind, FIG. 6 depicts another exemplary system 600 utilizing a parity-protected mirrored-array technique of the present invention having symmetry and parity and sparing distributed across all of the disks of the system. System 600 provides the previously mentioned advantages from a fault-tolerance point of view, but has a different characteristic that exemplary system 500 by having failure boundaries that are aligned.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method for storing data in a disk array having 2n+1 physical disks capable of storing n physical disks worth of data, the method comprising:
storing data on the n physical disks in at least one data stripe, each data stripe being divided into n substantially equal-sized groups called strips and being distributed across the n physical disks;
generating a parity strip for each respective data stripe, the data strips in each data stripe being included in the corresponding generated parity strip only once; and
distributing the data strips of each data stripe, a copy of each such data strip and the corresponding parity strip for each data stripe across the 2n+1 physical disks of the disk array, the data strips of each data stripe, the copy of each such data strip and the corresponding parity strip for each data stripe being on a respectively different disk of the array.

2. The method according to claim 1, wherein data is stored in a plurality of data stripes, and wherein a plurality of parity strips are distributed substantially equally across the 2n+1 physical disks.

3. The method according to claim 1, wherein the disk array further includes at least one spare physical disk, and
wherein distributing the data strips of each data stripe includes distributing the data strips of each data stripe, the copy of each such data strip and the corresponding parity strip for each data stripe across the 2n+1 physical disks and each spare disk of the disk array, the data strips of each data stripe, the copy of each such data strip and the corresponding parity strip for each data stripe being on a respectively different disk of the disk array.

4. A disk array comprising 2n+1 physical disks capable of storing n physical disks worth of data, data being stored on the disks in at least one data stripe, each data stripe being divided into n substantially equal-sized strips and being distributed across the n physical disks, each data stripe having a corresponding parity strip that is generated by including each of the data strips only once when the parity strip is generated, the data strips for each data stripe, a copy of each such data strip and the corresponding parity strip for each data stripe being distributed across the 2n+1 physical disks of the disk array, and the data strips for each data stripe, the copy of each such data strip and the corresponding parity strip for each data stripe being on a respectively different disk of the disk array.

5. The disk array according to claim 4, wherein data is stored in a plurality of data stripes, and wherein a plurality of parity strips are distributed substantially equally across the 2n+1 physical disks.

6. The disk array according to claim 4, wherein the disk array further includes at least one spare physical disk, and
wherein the data strips for each data stripe, the copy of each such data strip and the corresponding parity strip for each data stripe are distributed across the 2n+1 physical disks and each spare disk of the disk array such that the data strips for each data stripe, the copy of each such data strip and the corresponding parity strip for each data stripe are each on a respectively different disk of the disk array.

7. A disk array system comprising a plurality of disks, at least one disk being visible to a host data processing system, the disk array system being responsive to a host data write request from the host data processing system by performing only two read operations of the plurality of disks and only three write operations of the plurality of disks, and the disk array system capable of recovering all stored data when a failure occurs of any two disks of the plurality of disks.

8. The disk array system according to claim 7, wherein the plurality of disks store data, a full copy of the data and parity data computed over at least one subset of the data.

9. The disk array system according to claim 8, wherein the parity data is distributed substantially evenly among the plurality of disks in the array as a RAID 5 system configuration.

10. The disk array system according to claim 7, wherein at least one disk of the plurality of disks is a spare disk, and wherein spare space provided by each spare disk is distributed substantially evenly among the plurality of disks.

11. The disk array system according to claim 10, wherein the spare space provided by each spare disk is distributed among the plurality of disks in a similar fashion as the parity in a RAID 5 system configuration.

12. The disk array system according to claim 7, wherein the plurality of disks is partitioned into two sub-arrays, and
the disk array system further comprising a controller controlling each respective sub-array.

13. The disk array system according to claim 12, wherein the two sub-arrays are located remotely from each other.

14. The disk array system according to claim 12, wherein one sub-array is arranged as a RAID 5 system configuration, and
wherein the other sub-array is arranged as a RAID 0 system configuration, stores mirrored data of data stored on the sub-array arranged as the RAID 5 system configuration, and stores no parity data of the data stored on the sub-array arranged as the RAID 5 system configuration.

15. The disk array system according to claim 14, wherein the requests received from the host data processing system are selectively directed to either of the two sub-arrays for substantially balancing a workload of each disk of the two sub-arrays.

16. The disk array system according to claim 14, wherein the sub-array arranged as a RAID 0 system configuration includes a type of disk that is different from a type of disk included in the sub-array arranged as a RAID 5 system configuration.

17. The disk array system according to claim 14, wherein the sub-array arranged as a RAID 0 system configuration includes disks having a capacity that is different from a capacity of disks included in the sub-array arranged as the RAID 5 system configuration.

18. The disk array system according to claim 14, wherein the sub-array arranged as a RAID 0 system configuration includes a total number of disks that is different from a total number of disks included in the sub-array arranged as the RAID 5 system configuration.

19. The disk array system according to claim 12, wherein at least one disk of the plurality of disks is a spare disk, each spare disk providing spare space, wherein one sub-array is arranged as a RAID 5 system configuration and contains all parity information for data stored on the disk array system, and wherein the other sub-array is arranged as a RAID 0 system configuration and contains all of the spare space provided by each spare disk, stores mirrored data of data stored on the sub-array arranged as the RAID 5 system configuration and stores no parity data of the data stored on the sub-array arranged as the RAID 5 system configuration.

20. The disk array system according to claim 19, wherein the two sub-arrays are located remotely from each other.

21. The disk array system according to claim 12, wherein at least one disk of the plurality of disks is a spare disk, each spare disk providing spare space, wherein the spare space is distributed substantially evenly among the sub-arrays and among the plurality of disks, wherein a RAID 5 system parity stored by the disk array system is distributed substantially evenly among the sub-arrays and among the plurality of disks, and wherein one sub-array stores mirrored data of data stored on the other subs-array.

22. The disk array system according to claim 21, wherein the two sub-arrays are located remotely from each other.

* * * * *